FIG. I.

United States Patent Office 3,444,647
Patented May 20, 1969

3,444,647
PROCESS OF CULTIVATING ALGAE
Masahito Takahashi, 44 Nakaocho, Fukiai-ku,
Kobe-shi, Hyogo-ken, Japan
Continuation-in-part of application Ser. No. 518,615, Jan.
4, 1966, which is a continuation-in-part of application
Ser. No. 312,610, July 31, 1962. This application Nov.
20, 1967, Ser. No. 689,221
Claims priority, application Japan, Aug. 8, 1961,
36/27,947
Int. Cl. A01h *13/00;* A01g *7/00;* C02c *1/02*
U.S. Cl. 47—1.4                                       12 Claims

ABSTRACT OF THE DISCLOSURE

Process of cultivating algae by photoassimilation under non-sterile conditions. The algae are grown in a culture medium containing lower fatty acid, preferably acetic acid, propionic acid or butyric acid, as the principal carbon source, under illumination of an intensity of at least 500 lux. The pH value of the medium should be between 5.8–9.0. The medium may be aerated, preferably with $CO_2$-containing air, whereby the $CO_2$ constitutes an auxiliary carbon source and mixotrophic photoassimilation takes place.

Figure 1:
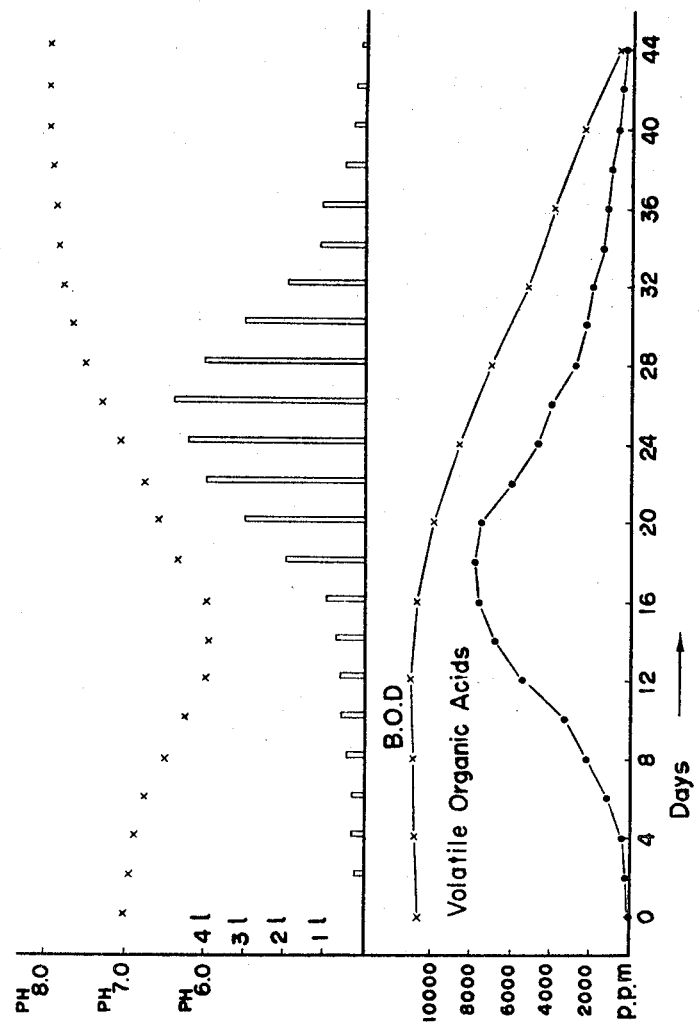

The culture medium may be obtained by anaerobically fermenting organic waste to form a ferment liquor containing lower fatty acid. The fermentation must be interrupted before methane fermentation sets in to avoid digestion.

*Cross-reference to prior applications*

This is a continuation-in-part of my copending application Ser. No. 518,615 filed Jan. 4, 1966, now abandoned, which, in turn, was a continuation-in-part of Ser. No. 312,610 filed July 31, 1962, now abandoned.

*Summary of the invention*

This invention generally relates to organic wastes and is particularly directed to a process of disposing of organic wastes and of cultivating algae in aqueous liquids formed from the wastes.

The term organic waste, as used herein, is deemed to include sewage, human and animal excrements, sludges and agricultural and industrial wastes containing organic substances which are capable of microbiological decomposition and also includes aqueous media containing or formed from such organic wastes.

According to the invention, organic wastes are purified and treated so as to obtain algae therefrom.

Essentially, the inventive process consists of two stages, to wit, a first stage in which organic substances contained in the waste are converted into lower fatty acids by fermentation and a second stage wherein algae are cultivated from the organic liquor derived from the first stage.

An important feature of the invention is that the cultivation of the algae in the second stage is carried out under non-sterile conditions. It will be appreciated that in cultivating algae, particularly in large scale cultivation procedures, it is disadvantageous and fraught with many technical difficulties to carry out the cultivation under sterile conditions. It constitutes consequently an important improvement and simplification if the cultivation can be carried out under non-sterile conditions.

The inventive process finds useful application, for example, in ecologically closed systems as for example embodied by space ships or space stations for treating excrements of the crew and other miscellaneous organic wastes which may be present.

According to one feature of the invention, water may also be recovered from the purified waste so that the wastes constitute a source of water for the crew. Moreover, according to a further feature of the invention, the photosynthetic action to which the waste is subjected may act as a gas exchanger.

Accordingly it is a primary object of this invention to provide a process for treating and purifying organic wastes for the purpose of growing algae.

Another object of the invention is to provide a procedure for effectively disposing organic wastes while simultaneously utilizing the wastes for useful purposes.

Generally, it is an object of this invention to improve on the art of organic waste disposal as presently practiced.

In sterile cultures as they have become known in the art, algae, such as Chlorella, grow heterotrophically in the presence of certain organic substances. It is known that the growth rate of bacteria in organic nutrients is generally more prominent than that of algae. Consequently, the bacteria growth dominates the algae growth to the detriment of the latter so that no significant amounts of algae can be grown simultaneously with bacteria and the algae growth is effectively inhibited.

In accordance with the present invention, it has been ascertained that lower fatty acids are, surprisingly, extremely effective organic substances for growing algae under non-sterile culture conditions. In this connection it should be observed that low molecular organic compounds, such as acetic acid, are not suitable nutrients for the growth of bacteria. By contrast, algae, particularly under illumination conditions, thrive on lower fatty acids and thus the growth of algae in such media is predominant while the growth of bacteria, by contrast, is substantially stagnant.

The principles and concepts of this invention will now be described by several examples, it being understood, however, that these examples are given by way of illustration and not by way of limitation and that many changes may be effected in the process conditions without affecting in any way the scope and spirit of this invention as recited in the appended claims.

Figure 2:
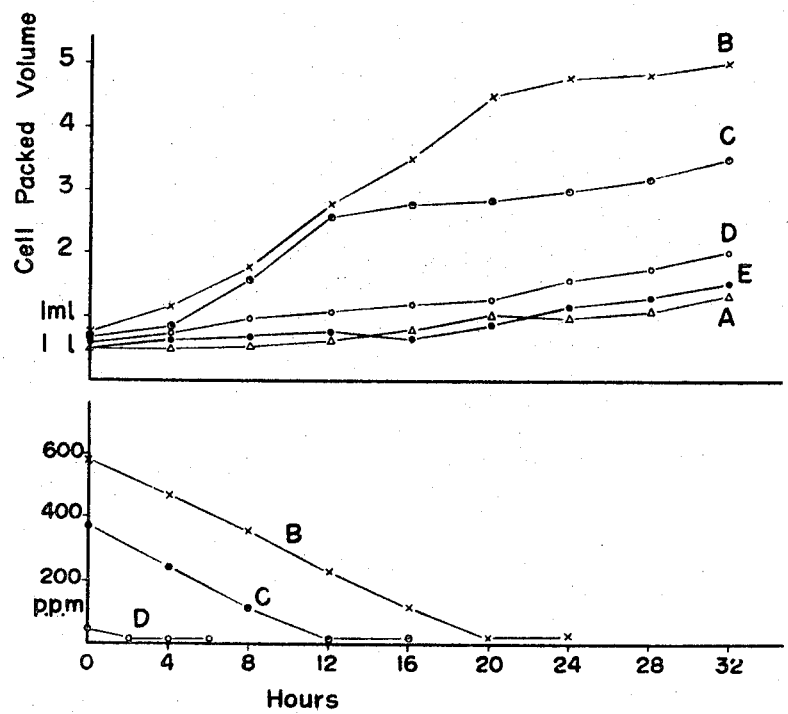
Figure 3:
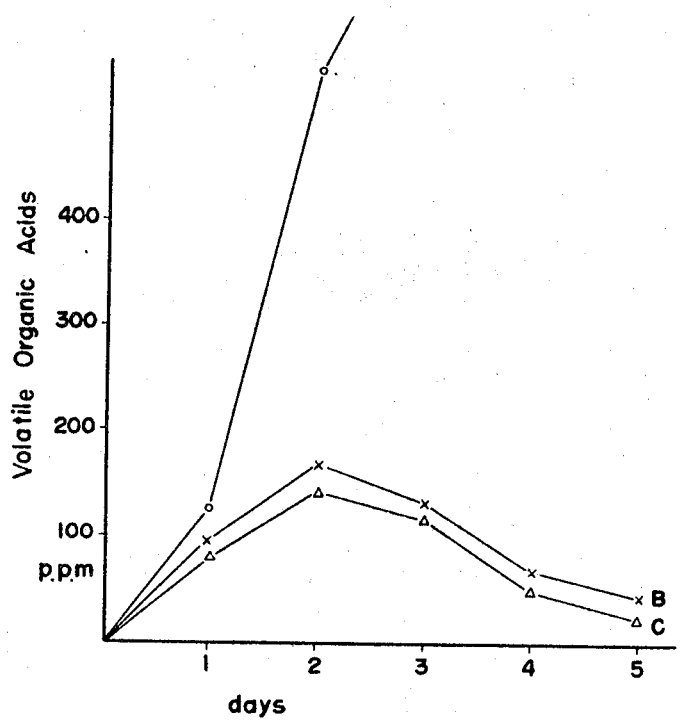

The results of the experiments are indicated on attached FIGS. 1, 2 and 3 as explained hereinbelow.

EXAMPLE I

Six culture solutions were prepared as follows:

*Solution 1.*—A modified Knop's solution was prepared by dissolving 1 gram of $KNO_3$, 0.2 gram of $K_2HPO_4$ and 0.2 gram of $MgSO_4 \cdot 7H_2O$ in tap water, the volume of the solution being made up to 1 liter.

*Solutions 2, 3, 4 and 5.*—The same solution as under 1 was prepared, however with one gram of sodium acetate being added per liter, and the pH was adjusted to a value of 6.0 by addition of HCl solution.

*Solution 6.*—The same solution as in 1 was prepared, with one gram of glucose being added per liter and the pH value was adjusted to 6.0.

Six flat flasks for cultivation of Chlorella (Tamiya et al.) were prepared and 500 ml. of solutions 1, 2, 3, 4, 5 and 6 were respectively filled into the six flasks. The cultures were then grown at 25° C. under illumination at 6000 Lux with a fluorescent lamp, while air admixed with 2% $CO_2$ was introduced into the flasks containing solutions 1, 2, 5 and 6. The air was introduced through a glass tube, the glass tube terminating close to the bottom of the respective flask. Details of the cultivation were in accordance with those taught by Tamiya.[1] However, in respect to solution 3, an air current was passed through the solution which had previously been washed with aqueous NaOH in a gas ---
[1] "Kinetics of Growth of Chlorella, Algae Culture (Burlew)," H. Tamiya et al., Carnegie Institute of Washington, D.C. Publication 600 (1953), p. 205–206.

washing bottle to eliminate the $CO_2$ contamination. Solution 4 was not subjected to aeration and solution 5 was treated with $CO_2$ containing air but not exposed to light.

Separately cultivated unsterilized Chlorella was removed from the supernatant by centrifuging. The Chlorella was then dispersed in a small amount of water and 20 ml. of the suspension thus obtained was added to each of the six flasks. Each of the flasks was then inoculated with Chlorella. The initial concentration of Chlorella at the start of the cultivating procedure was $4.5 \times 10^6$ cells per ml. in each of the flasks.

A number of Chlorella cells was then counted by a haemocytometer after 24 hours of growth. In solutions 1, 2, 3, 4 and 5, the cell numbers had increased to $12 \times 10^6$, $115 \times 10^6$, $72 \times 10^6$, $21 \times 10^6$ and $7.0 \times 10^6$, respectively, per ml. By contrast, in solution 6, to wit, the solution containing glucose, a white turbidity could be observed, and no increase in the number of cells was counted. Microscopic observation of solution 6, however, revealed that aggregates of cells, each consisting of several cells, were formed while floating in tiny colonies of bacteria.

Solution 5, in which an increase of the Chlorella cell number was likewise observed, developed a white turbidity which was weaker than that of solution 6 but proved on microscopic observation to be due to the presence of a number of bacteria. Solution 5, even after a further continuation of cultivation, showed no growth of Chlorella, but only an increase of bacteria.

It is thus evident that the growth of bacteria in a nutrient medium of the indicated kind and upon aeration in a solution containing glucose is much faster than that of Chlorella. Consequently, in these experiments the bacteria which originally contaminated the solution in a relatively small number multiplied and inhibited the growth of algae, resulting in turbidity of solution 6. No significant activity of Chlorella growth thus took place in solution 6 at the expense of the accelerated growth of bacteria, therefore resulting in efficient inhibition of algae production. In solution 2, by contrast, which contained the sodium acetate, a very significant growth rate of Chlorella algae could be observed.

In solution 1 the increase of Chlorella is obviously due to autotrophic growth purely by photosynthesis. In solutions 3 and 4, Chlorella growth was observed, irrespective of the absence of $CO_2$ supply to these solutions. This can reasonably be explained only by considering that the acetic acid in these solutions was absorbed and utilized as carbon source. As a matter of fact, it was established that the acetic acid content of these solutions decreased. In solution 5, by contrast, to which no light was supplied, the growth of Chlorella, once it had started, was suppressed after some time as a result of the propagation of bacteria. It is thus clear that for the absorption and utilization of acetic acid, the aid of light is necessary. The phenomenon just mentioned is known by the name of photoassimilation.

The high growth rate observed in soution 2 is due to the presence and cumulative effect of light, $CO_2$ and acetic acid, the algae growth therein being thus regarded as a mixotrophic growth in which both $CO_2$ and acetic acid are absorbed to be utilized as carbon source. In this case, 0.7 g. of acetic acid corresponds to about 1 g. by dry weight of Chlorella. Moreover, the growth rate of Chlorella in solution 2 proceeded in geometrical fashion, that is to say, the growth rate observed in this solution is higher than the sum of the rates observed in solutions 1 and 3. It is also known that bacteria can utilize acetic acid as carbon source for their growth. In fact, in solution 5 in which the cultivation was carried out in the absence of light, the growth of bacteria was rather predominant. It is known that aeration is effective in enabling Chlorella to utilize acetic acid as carbon for its growth even if complete darkness prevails, provided that the cultivation is carried out in the form of a pure culture and under sterile conditions. It was, however, not previously known that acetic acid may constitute a carbon source under non-sterile conditions.

It is thus clear that light is indispensable in carrying out the cultivation of Chlorella under non-sterile conditions. In other words, Chlorella, by the photo-assimilation facilitated by light, is capable to assimilate acetic acid and to grow in competition with bacteria.

As seen in the case of solution 3, the growth rate can be increased by aeration, as compared with cultivation without aeration.

Experience has demonstrated that only fatty acids such as propionic acid and butyric acid, as well as acetic acid, are effective for the non-sterile cultivation. The lower fatty acids advantageously used in carrying out the present invention are thus acetic acid, propionic acid or butyric acid. Many other organic substances were investigated, but the lower fatty acids mentioned above yielded the best results.

Consequently, a process is required in which the aqueous organic waste system is converted by fermentation into a solution which contains these lower fatty acids, which solution is thereby rendered suitable for the cultivation of algae.

EXAMPLE II

Three liters of sewage sludge were placed in a three liter glass bottle. The bottle was tightly closed by means of a rubber plug or stopper. The plug was equipped with two penetrating glass tubes. One of the tubes terminated above the contents of the flask to collect evolved gases formed in the bottle and to convey them through a rubber tubing into a gas receptacle. The other tube terminated close to the bottom of the bottle for sampling portions of the bottle content by suction.

The glass bottle was thermostatically maintained at a temperature of 30° C. and was shaken twice daily. The amount of evolved gas, the pH of the material in the bottle, and the concentration of volatile organic acids (calculated as acetic acid) were determined every second day. The five days B.O.D. (biochemical oxygen demand) of the material was ascertained every four days. The results are indicated in FIG. 1.

At first, as the pH of the sewage material gradually decreased to a slightly acidic value, liquefaction of the sewage sludge, as well as separation of the liquid phase from the solid sediment or precipitate, were observed. On the other hand, gradual increase of the concentration of the volatile organic acids suggested that complex organic substances in the sludge were subjected to bacterial decomposition to form soluble compounds of low molecular weight. Lower fatty acids were thus accumulated. The absence of any significant change in the five days B.O.D. indicated that the total amount of organic substances remained approximately constant.

After about 16 days, a maximum value was observed in the concentration of volatile organic acids. The acids were removed by steam distillation, treated by elution chromatography, and then titrated. It was found that the acids consisted of about 90% acetic acid, 6% propionic acid, and 3% butyric acid.

The gases which were formed during this time consisted of about 70% $CO_2$ and $O_2$ and $N_2$. No methane was discovered during the first 15 days. About 3% of methane was detected on the 16th day.

The pH value increased gradually from the 16th day onward until it reached a neutral value on the 24th day, whereafter it shifted slightly to the alkaline side. Accordingly, both the amount of volatile organic acids and the five days' B.O.D. intended to decrease, while the volume of generated gas, including the content of methane in the gas, showed rapid increase.

The gas sampled on the 26th day, for example, contained as much as 90% of methane. Thus, putrefaction had set in. The entire content of the bottle gradually assumed a dark brown color and gave off an unpleasant odor. Small quantities of ammonia and hydrogen sulfide began to appear in the evolved gases.

At this stage, the escape of methane, which is a decomposition product of organic acids, into the gas phase resulted in the apparent decrease of organic substances in the bottle, as was also confirmed and indicated by the decrease in the five days' B.O.D.

Finally, on the 44th day, no measurable amounts of volatile organic acids and generated gas could be detected. It was therefore concluded that the process consists of an acid fermentation which is predominant during the earlier stages and that thereafter methane fermentation takes place. These two types of fermentation, as is known, are caused by different types of bacteria.

The sludge was stored in a refrigerator (designated as A) and samples were taken in the course of the treatment on the 14th day (B), the 28th day (C) and the 44th day (D). All the samples were centrifuged at 2500 G for 15 minutes. 400 ml. of tap water and 50 ml. of the modified Knop's solution in which Chlorella had been cultivated were added to each 50 ml. of the supernatant removed from the samples. The Chlorella culture was conducted in the five solutions in the same manner as described in connection with Example I. The results are indicated in FIG. 2. 0.5 ml., as measured in a cell packed volume per liter, was used for the inoculation. The growth of Chlorella was also determined from cell packed volume. The lower diagram in FIG. 2 indicates the variation of concentration of volatile organic acids. Curve E indicates a control test performed by culturing the Chlorella on the modified Knop's solution alone, thus the curve demonstrating the growth rate as increased by photosynthesis.

As is clear from the figure, the result obtained with sample A which showed a small degree of Chlorella growth besides a pronounced growth of bacteria and visible white turbidity, is indicative of the necessity of fermentation for algae cultivation, while sample B indicates a rapid growth of Chlorella and at the same time a linear decrease in the concentration of acids. The growth is considered to be a mixotrophic one, the rate of which is several times as large as that of the autotrophic growth by photosynthesis as observed in sample E. As can be seen from curves B and C, a high growth rate was maintained only in the presence of organic acids. As soon as the acids disappeared, the growth rate of Chlorella changed to an appreciably lower rate which was controlled by photosynthesis. Curve C, after 12 hours and thereafter is in conformity with this phenomenon.

Sample B may thus be regarded as being most advantageous for algae cultures, the same experiment as in Example I, carried out with sample B, leading to the same results as in Example I. This means that also in liquor B the same mechanism of Chlorella growth occurs as in the modified Knop's solution enriched with acetic acid.

The waste was purified in other respects as well. Thus, 1050 p.p.m. of five days' B.O.D. of B before the Chlorella culture was effected, decreased to only 8 p.p.m. after the 32 hours culturing upon examination of centrifuged supernatant. The supernatant was applied to a morning glory flower and to a mouse as drinking water.

It can, therefore, be concluded that the above process in which organic waste is converted by fermentation into organic acids for subsequent mixotrophic culturing is highly advantageous for algae growth and that this process, from the standpoint of biological kinetics, is much more suitable than the algal bacterial symbiotic process in which organic substances are completely decomposed into carbon dioxide with subsequent photosynthesis. It should also be noted that the latter prior art process cannot readily be applied to materials of high organic concentration as frequently encountered in sludge samples.

One of the advantages of the present process over the prior art process such as Martin's process, as disclosed in U.S. Patent No. 2,908,113, is the brief period in which the process can be carried out since only organic acid fermentation is performed. In the prior art process, the fermentation is extended to a period during which methane fermentation takes place. By interrupting the process, when the organic acid fermentation has terminated, superior results in a brief period are obtained.

At present, the disposal of sludge by fermentation is widely practiced, for example, by using digestion tanks and digestors. As to the definition of the term digestion, reference to the following statement is made: "As the acidity recedes, alkaline or methane fermentation takes over, and the more resistant materials, including proteins and organic acids, are attacked. Large volumes of gas, consisting chiefly of methane besides carbon dioxide, are released. . . . The periods of acid fermentation and acid regression constitute a breaking in or ripening period through which sludge digestion tanks must pass when they are started . . . digestion is technically complete by the time 90% of the gas has been released."[3]

Since digestion designates a treatment conducted until fermentation comes practically to an end, digestion and acid fermentation are obviously different in nature and concept. The fundamental premise of the present invention resides in the fact that the treatment which is truly effective for algae cultivation is not digestion or digester treatment but rather acid fermentation itself concerned from the viewpoint of algae growth as well as in all other aspects concerned.

As contrasted to the digestion processes, the fermentation process of the present invention is interrupted when the solid matters of the organic waste, which are composed of complex organic substances, have been solubilized by organic acid fermentation. For this reason, the time for completing the inventive process is considerably shorter.

In the customary digestion tanks, the organic sludges are successively introduced into and withdrawn from the tanks and the sludges are maintained at about 30–35° C.: the contents are agitated or the scums formed at the surface of the sludge are broken up by means of a scum breaker to improve the efficiency. These mechanical devices can be readily applied with advantage to the process of the present invention.

The temperature at which the inventive process is to be carried out is an important factor because the rate of organic acid fermentation is significantly influenced by the temperature. The fermentation rate is increased upon increase of temperature. For example, the organic acid fermentation of the invention as applied to excrements takes about 10 to 15 days until completion at 30° C., but can be completed in about 5 to 7 days at 53° C. by thermophilic microorganism.

EXAMPLE III

Two liters of water are placed in a two liter glass bottle. The bottle with its content was thermostatically kept at a temperature of 53° C. The water was slowly agitated with a stirrer rod having a T-shaped end. 400 ml. of the content of the bottle were removed each day and a corresponding volume of excrement was added instead. The concentration of volatile organic acids in the removed samples was simultaneously determined. The values thus ascertained were as follows:

500 p.p.m. on the first day;
2000 p.p.m. on the fifth day;
9300 p.p.m. on the seventeenth day.

No significant change was observed thereafter. The detention time was estimated to be five days and the organic acid fermentation was presumably sufficient. On changing the volume of the removed samples and the excrement ---
[3] "Sewage Treatment," Imhoff & G. M. Fair, John Wiley & Sons, Inc., New York, 2nd Edition 1956), pages 184 and 201.

which was added instead to 100 ml., the quantity of organic acid showed almost no variation throughout 30 days. This indicates that higher temperatures suppress the methane fermentation. Since the absence of methane fermentation favors the inventive process, a relatively high temperature process is consequently preferred.

Although various kinds of microorganisms capable or organic acid fermentation are found widely distributed in nature, a particularly suitable kind or group of microorganism for this purpose is found in the waste water in which the organic acid fermentation has taken place to some extent. Therefore, such waste waters may be employed with a better result than fresh wastes. In this respect, a successive treatment as disclosed in Example III is more desirable.

As is known, methane fermentation which follows the organic acid fermentation is inactivated at above 3000 p.p.m. of the organic acid concentration and the methane fermentation ceases completely if this condition continues to exist. Consequently, the fermentation of this invention can be facilitated by initially adding organic acids to the waste.

It is also known that with a decrease of the pH valve, the methane fermentation is inhibited and does not take place to any significant extent. In Example II, the slight acidity which was obtained could be maintained by introducing fresh sludge to the system which in turn produces additional amounts of acid. The resulting acidity prevents the methane fermentation from taking place and accelerates the increase of acid concentration.

In actual practice, the organic acid fermentation can be caused to prevail in the operation of conventional digestion tanks for the digestion of sludge in which the pH decreases to less than 6.0 while the organic acid content increases to about several thousands p.p.m. The generation or evolution of gas decreases with an accompanying decrease of the methane content in the gas. Such conditions suggest inferior performance of the digestion tank. The remedy applied for improving the methane fermentation is to add lime to raise the pH valve, to add water to decrease the acid concentration, or to introduce digested sludge into the tank from other customarily operated tanks. These conditions which are unfavorable to the conventional digestion processes are rather desirable to the process of this invention.

Briefly, therefore, a balance between the acid concentration and the methane fermentation is maintained in conventional digestion tanks in the sense that organic acids which are formed are immediately converted into methane without permitting any accumulation of the acids. The biological balance, however, is unstable and liable seriously to interfere with the procedure of digestion.

The following examples deal with the specific pH and light quantity conditions most favorable for algae cultivation conducted by photoassimilation as carried out in a medium containing the lower fatty acids formed as described above.

EXAMPLE IV

A sample containing 9300 p.p.m. of volatile organic acid obtained in the experiment of Example III was centrifuged at 2000 G for 15 minutes. The supernatant liquor thereby formed was taken up, diluted with tap water to 15 times its volume and admixed with $KH_2PH_4$ in an amount of 0.5 g. per liter to impart the diluted liquor with some degree of buffering activity. From the solution thus obtained were prepared, by adjusting the pH with aqueous HCl or NaOH, liquors: A(pH 5.5), B(pH 6.0), C(pH 7.0), D(pH 8.0) and E(pH 9.5). In addition, liquor F was prepared by six times dilution of liquor A.

Chlorella was cultivated as in Example I in the presence of a stream of $CO_2$-admixed air and under illumination at 6000 lux, until a cell packed volume of 20 ml. per liter was attained. Each 20 ml. of this Chlorella culture solution was added for inoculation purposes to each 500 ml. of the above prepared culture liquor samples A to F. The cell packed volume observed for these sample liquors at the start of the culturing was 0.8 ml. per liter.

After 24 hours of cultivation, the growth of Chlorella was determined by observing the cell packed volume. Sample A showed practically no growth with the green of Chlorella beginning to turn yellow. The cell packed volume observed was 4.5 ml./l. for B, 4.4 ml./l. for C, 4.2 ml./l. for D, 1.0 ml./l. for E, and 1.4/l. for F. The growth stagnation in liquor A is indicative of the fact that the presence of volatile organic acids in such high concentrations as to result in a pH of 5.5 or lower, suppresses the Chlorella growth. It is most likely that at such low pH values, the acetic acid is hardly dissociated and the acid, in molecular state, readily passes through the cell wall of Chlorella to act as a poison on the algae. In liquor F, Chlorella growth of only (1.5−0.8=) 0.7 ml. per liter took place. This indicates that the low concentration of volatile organic acids in this liquor was not completely inhibitive, but permitted the algae to grow with difficulty, as suggested by the slow pace of growth actually observed.

Since the acidity value of pH 5.5 is a value customarily regarded and employed as suitable in carrying out photosynthetic cultures, the phenomenon observed for liquors A and F is to be regarded as remarkable and surprising and indicative of the fact that the culturing, in the presence of volatile organic acids, proceeds in essentially different manner than it does in the normal type of photosynthetic culturing. It has been confirmed by experiments that when the culturing is carried out in the presence of organic acids, the pH should be adjusted to a value of at least 5.8, but preferably higher, and that Chlorella cannot grow in the alkaline range above pH 9.5. It is thus a matter of importance to maintain the pH between values of 5.8 and 9.0.

EXAMPLE V

A sample containing volatile organic acids in a concentration of 9100 p.p.m., which sample was obtained in the experiment of Example III, was centrifuged at 2000 G for 15 minutes. The supernatant liquor thereby formed was taken up and diluted with tap water, the pH being adjusted to 6.0. Inoculation of this culture solution was carried out in the same way as in Example I. The initial concentration of Chlorella was $5.5 \times 10^6$ per ml. by cell number.

The culturing was carried out in the same manner as in Example I, but the illumination was varied so that there were obtained samples A (not illuminated), B (300 lux), C (800 lux), D (1500 lux and E (5000 lux).

Chlorella growth was determined after 24 hours culturing by counting the cell member by means of a haemocytometer. The following cell numbers were counted: $6.5 \times 10^6$ for A, $7.5 \times 10^6$ for B, $65 \times 10^6$ for C, $90 \times 10^6$ for D and $130 \times 10^6$ for E.

In samples A and B, while Chlorella growth was almost negative, bacteria growth was positive, the samples beginning to show white turbidity. Positive growth of Chlorella was observed only in samples C, D and E, for the growth by photoassimilation at least 500 lux or more light being thus considered necessary.

Continuous illumination is not necessary and alternating light and darkness conditions yield satisfactory results.

When organic acid fermentation takes place, only then a much higher activity for decomposing organic substances and a lesser amount of residual solid matter can be expected.

EXAMPLE VI

To 200 ml. of a sample taken from the material described in Example II on the 18th day were added 10 ml. of acetic acid. The mixture, together with 1.8 l. of excrement, was placed in a 2 l. bottle and maintained thermostatically at a temperature of 30° C. The mixture was continuously agitated as in Example III. The initial concentration of organic acids was 5700 p.p.m.

200 ml. were removed every day and an equivalent volume of excrement was added instead. The concentration of volatile organic acids was as follows:

After 5 days—7000 p.p.m.;
After 10 days—10,300 p.p.m.; and
After 20 days—11,000 p.p.m.

The relative volume of the residual solid matter which settled by gravity was about 5.5% of the total volume. In this connection it should be noted that the average volume of residual solid matter in conventional digestion tank procedures is about 10% so that in accordance with the present invention an appreciably lower amount of residual solid matter is obtained.

A comparison experiment carried out with diluted waste water made it clear that a higher and thus more advantageous rate of acid fermentation can be obtained with higher concentration of organic substances in the waste water. On the other hand, however, the maximum concentration of the acids can be reached more rapidly if the waste water contains a lesser concentration of organic substances.

EXAMPLE VII

Three tests were performed in three separate two-liter bottles. The first bottle was fed with excrement (A). The second bottle was supplied with excrement diluted with 30 times its volume of water (B), while the third bottle contained human sewage of 420 p.p.m. of 5 days B.O.D. (C). The bottles were then closed by bored rubber stoppers and thermostatically maintained at a temperature of 30° C. Each bottle was shaken twice a day. The concentration of volatile organic acids varied as plotted in FIG. 3.

The sample of A reached concentration of organic acids of 6500 p.p.m. in 15 days. In comparing sample A with sample B, to wit, the sample which had been diluted with water, the fermentation period of 15 days required for A corresponded to 60 days (30 times 2 days) of B, while the concentration of the acids, to wit, 6500 p.p.m. of A, was considerably greater than the 4800 p.p.m. (30 times 160 p.p.m.) of B. This may be due to the more rapid decomposition of the acids caused by dissolved oxygen in the water and the dilution of the acids. It may reasonably be concluded from this observation, that a very large dilution does not favor the intended result. In respect to sample C, which contained the human sewage, the maximum acid concentration was reached in two days.

This indicates that the fermentation proceeds more advantageously if the organic matter is present in a state of high concentration. It is thus advantageous, also with excrement, to subject the undiluted excrement to fermentation and to dilute the fermentation product at the time of algae culturing.

The excrement digestion liquor disclosed in U.S. Patent 2,908,113 to Martin which is used in algae culturing, corresponds to sample B because it has a dilution degree of about 30 times. In view of the fact that the digestion treatment period of the U.S. patent is as long as 14 days and that the acid fermentation comes to an end within a few days in which organic acids are converted almost exclusively to $CO_2$, the present process is to be distinguished from the disclosure of the U.S. patent. The present invention is advantageous not only because of the shortness of the fermentation treatment period, but also because the organic acids contained in the medium enable the algae to grow very rapidly. The present process is evidently quite different from that of Martin. It should be pointed out that Martin calls his process explicitly a digestion procedure.

As will have been appreciated from the above, according to the inventive process organic acids are produced by organic acid fermentation, as distinguished from digestion, in organic aqueous waste systems to be treated. The liquid phase, after being separated from the solid phase, is then used as a medium for culturing algae.

Separation of the liquid phase from the solid phase may be performed in any suitable manner as for example by filtration, gravity precipitation or centrifuging.

Algae are not in a position to decompose complex organic substances comprising solid matter nor can algae take nourishment from such substances. By contrast, bacteria thrive on such material. If the solid is not separated from the liquid, bacteria will thus grow in the system and will in turn inhibit the growth of algae as previously noted. The separation of the liquid phase from the solid phase is also required because the solid matter has a tendency to contaminate the grown algae during the separation of the latter from the systems.

Waste water which has been treated with the organic acid fermentation of the invention can immediately be used for algae culture without any additional treatment. However, it is preferred if the waste water is diluted with a suitable amount of water, particularly if the acid concentration is very high.

Although the reason is not quite understood, experiments have revealed that algal growth is stimulated if the culturing medium, to wit, the liquid is first heated to 40° C. or higher temperatures and is then cooled before the actual cultivation process is carried out.

The cultivating liquids prepared in accordance with the invention contain generally insignificant amounts of salts of phosphate and magnesium, as demonstrated by analysis. It was found that intentional addition of such salts either prior to or during the culturing favored the rate growth and the yield.

It was established that any kind of algae can be grown in the liquid medium referred to. The liquid may be maintained in a stagnant condition such as in a shallow pool, or it may be kept in circulation or aerated with air or air enriched by $CO_2$. Culturing in an illuminated vessel gives particularly favorable results. The liquid produced according to this invention may also successfully be employed for the growing of photosynthetic microorganisms including Chlorella, Scenedesmus, Euglena and Chlamydomonas. Other algae can also be grown.

The algae, at the end of the treatment, may be collected in any suitable manner, for example by centrifugal separation or separation as aggregated precipitates by means of chemical treatments.

The algae produced in accordance with the invention, after drying may be used for many different purposes as, for example, as food for humans and animals, as industrial raw material and for the manufacture of drugs.

While specific embodiments of the invention have been shown and described in detail to illustrate the application of the inventive principles, it will be understood that the invention may be embodied otherwise without departing from such principles.

What is claimed is:
1. A process of cultivating algae under non-sterile conditions, which comprises:
   (a) subjecting organic waste material to anaerobic fermentation until lower fatty acids are formed and interrupting the fermentation before appreciable methane fermentation sets in to avoid the occurrence of digestion, whereby a ferment liquor containing lower fatty acid and overlying a ferment solids layer is obtained;
   (b) separating the ferment liquor from the ferment solids layer; and
   (c) growing algae by photoassimilation under non-sterile conditions and under illumination in said ferment liquor, said lower fatty acids constituting the main carbon source.
2. A process as claimed in claim 1, wherein said illumination is carried out at an intensity of at least 500 lux, said ferment liquor being maintained at a pH of 5.8–9.0.

3. A process as claimed in claim 2, wherein the photosynthetic cultivation is continued even after the fatty acids have been absorbed from the liquor by the algae.

4. A process as claimed in claim 2, wherein step (a) is carried out under agitation.

5. A process as claimed in claim 2, wherein the grown algae are recovered and separated.

6. A process as claimed in claim 2, wherein the ferment liquor obtained in step (b) is diluted with water before the growing of the algae therein.

7. A process as claimed in claim 2, wherein phosphate salt is added to the liquor of step (b).

8. A process as claimed in claim 2, wherein step (a) is carried out at elevated temperature and in the presence of thermophilic organisms.

9. A process as claimed in claim 2, wherein step (a) is carried out continuously by continuously supplying and withdrawing organic waste material.

10. A process as claimed in claim 2, wherein step (a) is carried out at an acidic pH value.

11. A process as claimed in claim 2, wherein said fermentation of step (a) is discontinued when the concentration of the lower fatty acids has reached a maximum value.

12. A process of cultivating algae by photoassimilation, which comprises subjecting a non-sterile culture medium containing lower fatty acid as the principal carbon source and having a pH value of about between 5.8–9.0 to illumination of an intensity of at least 500 lux, said non-sterile culture medium being the liquid portion formed in the anaerobic fermentation of organic waste material, said anaerobic fermentation having been interrupted before substantial methane formation has set in.

References Cited
UNITED STATES PATENTS

| | | | |
|---|---|---|---|
| 2,908,113 | 10/1959 | Martin | 47—1.4 |
| 2,949,700 | 8/1960 | Kathrein | 47—1.4 |
| 3,241,943 | 3/1966 | Bystrom | 71—10 X |

OTHER REFERENCES

Ludwig, C. A.: American Journal of Botany, vol. 25, June 1938, pp. 448–458, pp. 449 and 451–453 particularly relied on (photostat copy in group 410) 47–1.4.

Gotaas, H. B., et al.: The Scientific Monthly, December 1954, pp. 368–378 (photostat copy in group 170) 210–11.

Gafford, R. D., et al.: J. of Biochemical and microbiological Tech. and Eng., vol. II, September 1960, pp. 302 and 303 relied on (copy in group 410) 47–1.4.

Hevkelekian, H.: Appearing in Biological Treatment of Sewage and Ind. Wastes, vol. II, edited by McCabe, J., et al., Reinhold Corp., N.Y., pp. 34–40, 42 and 43 relied on (copy in group 176).

MICHAEL E. ROGERS, *Primary Examiner.*

U.S. Cl. X.R.

210—11, 12